(12) United States Patent
Cleveland (10) Patent No.: US 11,316,828 B2
(45) Date of Patent: Apr. 26, 2022

(54) NETWORKING SUB-RANGES

(71) Applicant: Hewlett Packard Enterprise Development LP, Houston, TX (US)

(72) Inventor: Christian E. Cleveland, Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 91 days.

(21) Appl. No.: 16/584,771

(22) Filed: Sep. 26, 2019

(65) Prior Publication Data
US 2021/0099421 A1 Apr. 1, 2021

(51) Int. Cl.
| | |
|---|---|
| *H04L 29/12* | (2006.01) |
| *H04L 12/46* | (2006.01) |
| *H04L 29/06* | (2006.01) |
| *H04L 101/695* | (2022.01) |
| *H04L 101/604* | (2022.01) |

(52) U.S. Cl.
CPC ...... *H04L 61/6095* (2013.01); *H04L 12/4641* (2013.01); *H04L 61/6004* (2013.01); *H04L 63/101* (2013.01)

(58) Field of Classification Search
CPC ............. H04L 61/6095; H04L 12/4641; H04L 61/6004; H04L 63/101
See application file for complete search history.

(56) References Cited

U.S. PATENT DOCUMENTS

| | | | | |
|---|---|---|---|---|
| 6,516,383 | B1 * | 2/2003 | Patra ..................... | G11C 15/00 365/49.16 |
| 6,633,548 | B2 * | 10/2003 | Bachmutsky ........... | H04L 45/00 370/255 |
| 8,619,451 | B1 * | 12/2013 | Argyres ................... | G11C 5/14 365/49.17 |
| 8,619,562 | B1 * | 12/2013 | Krivitski ............. | H04L 49/3009 370/230 |
| 10,382,390 | B1 * | 8/2019 | Venkataramanan .... | H04L 63/10 |
| 2007/0115986 | A1 * | 5/2007 | Shankara .............. | H04L 63/145 370/392 |
| 2011/0307655 | A1 * | 12/2011 | Gao ........................ | H04L 45/54 711/108 |
| 2014/0050002 | A1 * | 2/2014 | Sun ........................ | G11C 15/00 365/49.1 |

(Continued)

OTHER PUBLICATIONS

Donald Krambeck, "Prime Implicant Simplification Using Petrick's Method," available online at <https://www.allaboutcircuits.com/technical-articles/prime-implicant-simplification-using-petricks-method/>, Feb. 17, 2016, 7 pages.

*Primary Examiner* — Thomas J Dailey
(74) *Attorney, Agent, or Firm* — Hewlett Packard Enterprise Patent Department (57) ABSTRACT

Examples include receiving a first minimum value in a range of consecutive networking integers, determining a first ternary content-addressable memory (TCAM) value based on the minimum, determining a number of trailing zeros in the first TCAM value, determining a proposed TCAM mask based on the number of trailing zeros and a binary opposite of the TCAM value, comparing the proposed TCAM mask to a maximum value associated with the range, determining a first TCAM mask for the first TCAM value based on the comparison, and setting the first TCAM value and the first TCAM mask in a networking device TCAM.

20 Claims, 5 Drawing Sheets

(56) References Cited

U.S. PATENT DOCUMENTS

2014/0208016 A1* 7/2014 Malik ................... G11C 15/04
                                                711/108
2015/0341270 A1* 11/2015 Basso .................. H04L 63/101
                                                711/108
2017/0093715 A1* 3/2017 McGhee .............. H04L 45/745

* cited by examiner

NETWORKING SUB-RANGES

BACKGROUND

User devices may access a network using networking devices (e.g., routers, switches, etc.). The user devices may communicate to each other in a variety of ways using the networking devices to relay a data packet across the network. Additionally, the user devices may use the networking devices to access data stored in a server in the network. In some examples, the network may be configured such that specific user devices may access specific portions of the network. Additionally, the network may be configured such that multiple applications share the same physical resources but are logically segregated. The access restrictions may be enabled by ACLs and the logical segregation may be applied via VLANs.

BRIEF DESCRIPTION OF THE DRAWINGS

The following detailed description references the drawings, wherein.

DETAILED DESCRIPTION

Administrators may use values, such as integers as a way to label components of a network. For example, an access control list (ACL) may have access rules based on specific source and/or destination ports labeled by integers. As another example, VLANs may also be labeled with integers. These integers may be characterized as networking integers. These integers are then associated with specific networking rules in a memory of the networking device. When a packet is received by the networking device, the fields storing those networking integers are compared to the rules stored in the networking device. Based on the specific rule, a packet is then routed accordingly (e.g., granted access or denied access in the example of an ACL). One network may have a various ranges of networking integers that have to be associated with specific networking rules.

In some examples, a specialized memory may store the association of the range to the networking integer. This specialized memory may allow for quick processing times helpful in networking situations. Some non-limiting examples of specialized memory include TCAMs, which store entries in the form of a TCAM value and a TCAM mask. In some examples, a consecutive networking integer range may be programmed into the TCAM using a single value and mask. For example, port numbers 0 through 1023 can be represented by the TCAM value 0x0 and TCAM mask 0xFC00. However, in examples where the range cannot be represented by a single value/mask, then the range would need to be split into single entries in the TCAM, where each integer in the range would require its own entry. For example, the range 0 through 1024, if unable to be captured by one single value and mask, would need to be split up into 1025 single entries. This would increase the time and space required to store the entries. This inefficiency is exacerbated where the networking rule is related to two different fields. For example, if an ACL has a rule that matches both a source L4 port and a destination L4 port, every combination would need to be enumerated. If the source ports were 0 through 1024 and the destination ports were also 0 through 1024, 1,050,625 (1025×1025) single entries would be needed to accurately capture that ACL rule.

Examples disclosed herein address these technical problems by providing a method to take a range of integers used in a networking capacity and break down the range into sub-ranges that can be represented by TCAM values and TCAM masks. In some examples, the minimum value in the range is determined to be the first TCAM value. A binary opposite of the first TCAM value is determined and a proposed TCAM mask is determined based on the binary opposite of the first TCAM value and the trailing zeros in the first TCAM value. A first TCAM mask is determined based on the proposed TCAM mask and the maximum in the range of integers. The first TCAM value and the first TCAM mask is the first sub-range of the whole range. The method may include determining multiple TCAM values and masks such that the whole range is covered by the sub-ranges. The method also includes programming the TCAM values and masks into TCAM entries and associating the entries with a networking rule. Accordingly, the methods disclosed herein allow for an integer range applicable in a networking capacity to be covered by fewer TCAM entries. This reduces use of resources and time for an administrator to configure the network.

In some examples, a computing device is provided with a non-transitory machine-readable storage medium. The non-transitory machine-readable storage medium includes instructions, that, when executed, cause a processing resource to receive a first minimum value in a range of consecutive networking integers, determine a first ternary content-addressable memory (TCAM) value based on the minimum, determine a number of trailing zeros in the minimum, and determine a proposed TCAM mask based on the number of trailing zeros and a binary opposite of the TCAM value. The instructions, when executed, also cause the processing resource to compare the proposed TCAM mask to a maximum value in the range, determine a first TCAM mask for the first TCAM value based on the comparison, and set the first TCAM value and the first TCAM mask in a networking device TCAM.

In some examples, a method comprises determining a first TCAM value based on a first minimum value in a range of networking integers, determining a proposed TCAM mask based on a number of trailing zeros in the first TCAM value and a bit width of the networking integers, determining a first TCAM mask based on the proposed TCAM mask and a maximum value in the range, setting the first TCAM value and the first TCAM mask in a first entry of a networking device TCAM, and associating the first entry to a first networking rule.

In some examples, a networking device comprises a range reduction engine and a TCAM engine. The range reduction engine is to determine a first TCAM value based on a first minimum value in a range of networking integers, determine a proposed TCAM mask based on a number of trailing zeros in the first TCAM value and a binary opposite of the first TCAM value, and determine a first TCAM mask for the first TCAM value based on a comparison of the proposed TCAM mask to a maximum value in the range of networking integers. The TCAM engine is to set the first TCAM mask and the first TCAM value in a first entry on a TCAM of the networking device.

Figure 1:
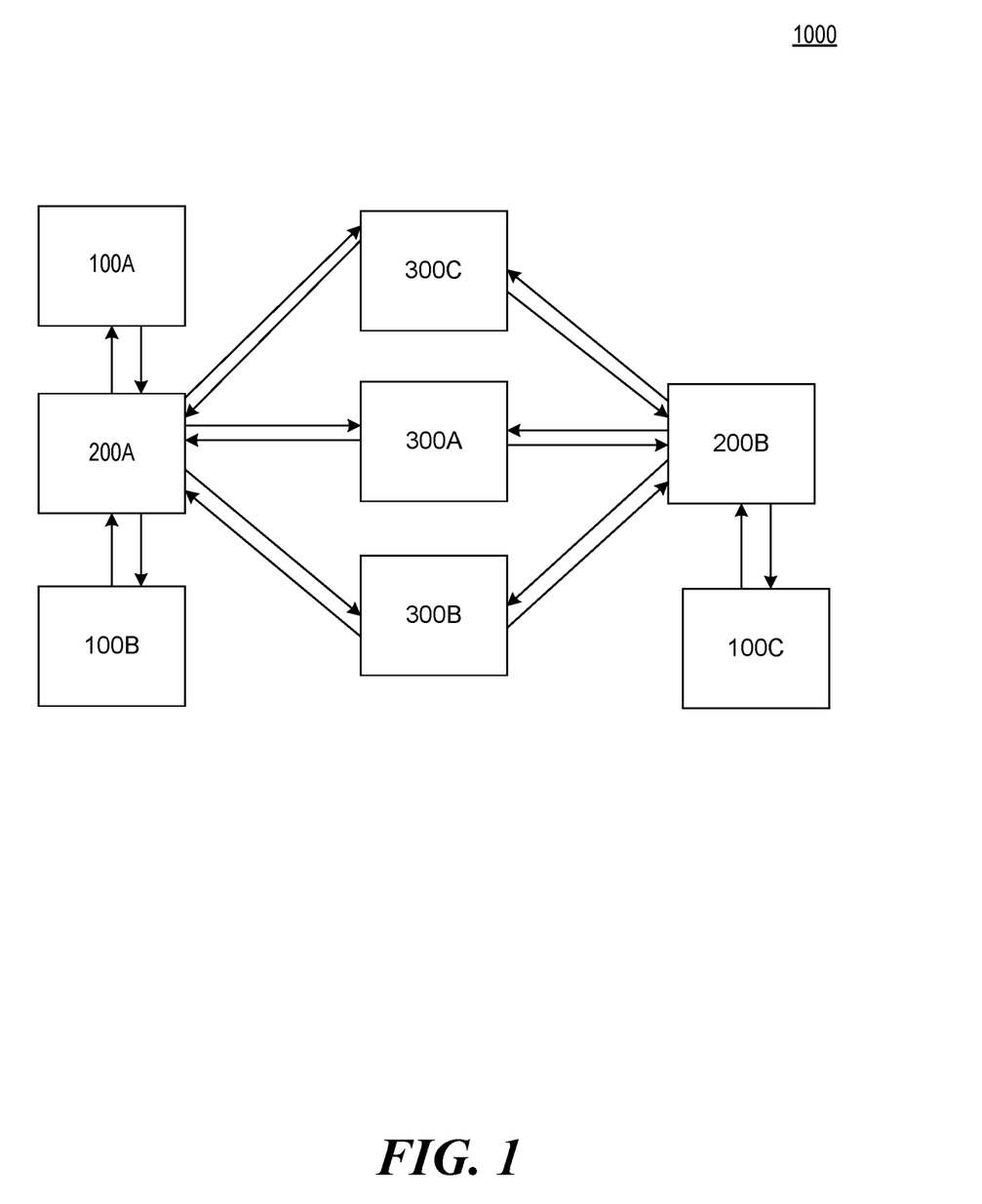
FIG. 1 is a block diagram of a network comprising networking devices with access control lists (ACL), according to some examples.

Referring now to the figures, FIG. 1 is a block diagram of a network 1000 comprising multiple networking devices 200A, 200B and computing devices 300A, 300B, 300C. As used herein, a networking device may be a device used in a network for the transmission of packets to the network (e.g. from an outside network), from the network (e.g. to an outside network), and/or within the network (from one device in the network to another device in the network). Non-limiting examples of a networking device include a router, switch, etc. Networking devices 200A and 200B may allow computing devices 100A, 100B, and 100C to connect to computing devices 300A, 300B, and 300C in network 1000. As used herein, a "computing device" may include a server, a networking device, a chipset, a desktop computer, a workstation, a mobile phone, a tablet, an electronic reader, or any other processing device or equipment. Network 1000 may be configured such that different portions of the network have different access requirements.

For example, computing devices 300A, 300B, and 300C may be servers hosting data of an enterprise while computing devices 100A, 100B, and 100C may be user devices (e.g., desktop computer, mobile phone, etc.) trying to obtain the data. Network 1000 may be configured such that different portions of the network are accessible to different end users. For example, computing device 300A may only be accessible to users with a first credential, computing device 300B may only be accessible to users with a second credential, and computing device 300C may only be accessible to users with a third credential. Networking devices 200A and 200B may be configured with network access capabilities, allowing those devices to grant access to user devices having the needed credentials.

For example, computing device 100A may request, via networking device 200A, to access data stored on computing device 300C. However, computing device 100A does not have the needed credentials to access this data. Networking device 200A may be configured to allow access to computing device 300C to user devices having a required credential. Upon seeing that computing device 100A does not have this credential, networking device 200A denies computing device 100A access. Computing device 100C may similarly request, via networking device 200B, access to data on computing device 300C. Upon seeing that computing device 100C has the required credentials, networking device 200B may grant access.

Accordingly, networking devices 200A and 200B may be configured with access control capabilities such as Access Control Lists (ACLs) in which a particular credential in the transferred packet is associated to a network access rule. In some examples, the credential may comprise layer 4 (transport layer) Open Source Interconnection model (OSI) source and/or destination ports. These ports numbers may be transmitted from the user device 100A, 100B, 100C to the networking device 200A/200B in the packet. The port numbers may be associated to different networking rules stored on the networking device. The networking device may look up the ports and determine whether access should be granted based on the rule that is returned.

In some examples, the networking rules are stored on a memory structure of the networking device that is used for networking purposes. This memory structure may be high speed and may be separate from other types of memory used for storage of software during runtime (random access memory (RAM)) or non-volatile memory where software is more permanently stored. Non-limiting examples include a content addressable memory (CAM) or ternary content-addressable memory (TCAM). In some examples, there may be a range of L4 ports. The range of L4 ports, comprising of integers, may be split up into various sub-ranges, and each sub-range may be associated to a networking rule. These sub-ranges may be represented in the memory structure as a value and a mask, the value representing the smallest integer in the port sub-range and the mask representing the significant bits of the value. From the value and mask of the first sub-range, the second sub-range's smallest integer may be determined. Accordingly, networking devices 200A and 200B comprise the functionality to allow for the efficient splitting of the entire range of ports into sub-ranges in order to maximize usage of the memory structure space, allowing for entries in the memory structure to cover all the ports for which a networking rule exists.

Figure 2:
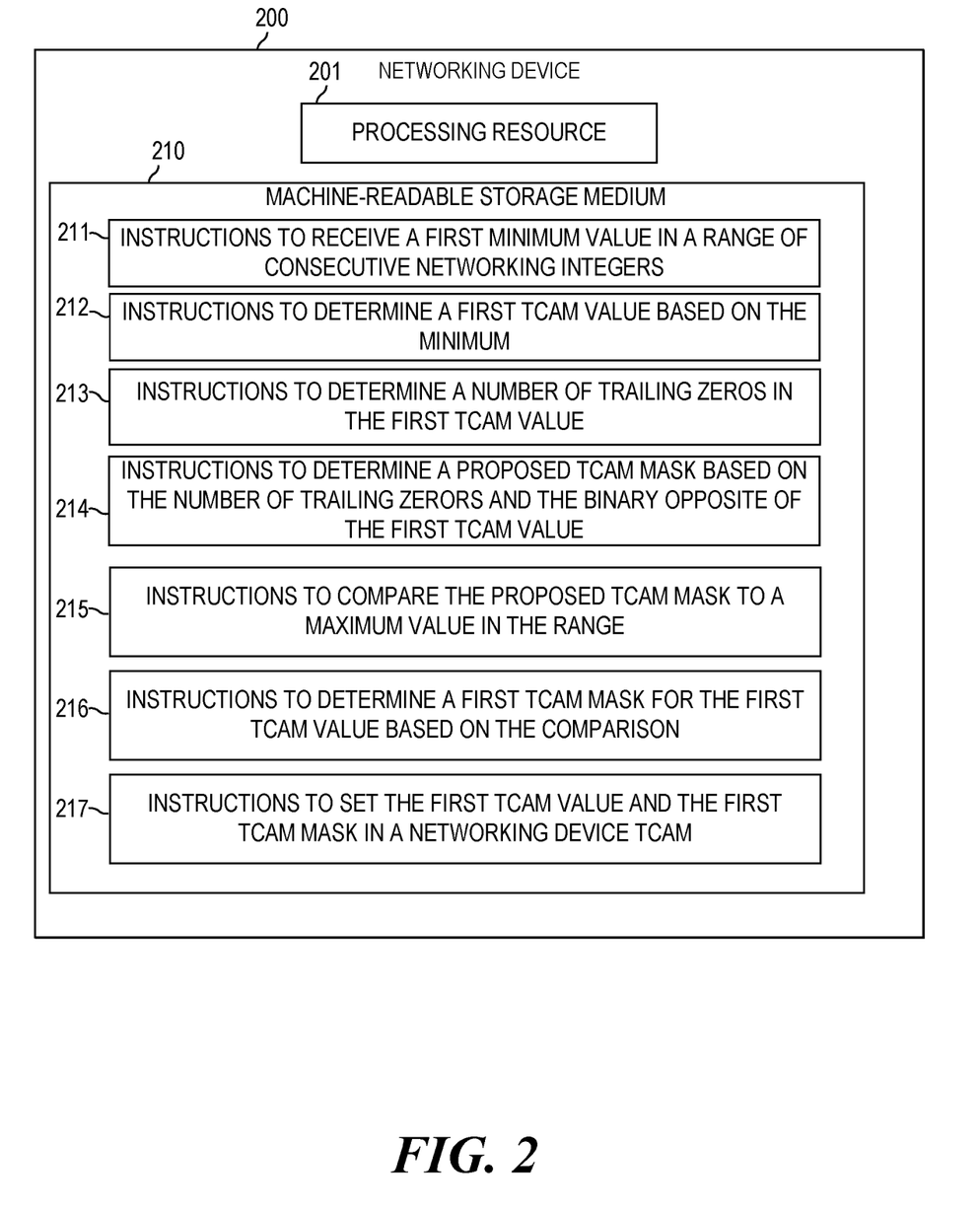
FIG. 2 is a block diagram of a networking device to determine sub-ranges of a range of networking integers, according to some examples.

FIG. 2 is a block diagram of a networking device 200 to determine sub-ranges in a range of networking integers. As used herein, networking integers include integers that are used in a networking capability. These integers may be used to describe different characteristics or components of a network. In some examples, these integers may be present in fields in a packet that is sent over a network. Non-limiting examples of characteristics or components that networking integers may describe include ports in a destination or source computing device (for example such as those used in an OSI model L4 protocol), virtual local area networks (VLANs) in L2 architecture, physical interfaces (ports), etc.

Networking device 200 includes a processing resource 201 and a machine-readable storage medium 210. Machine readable storage medium 210 may be in the form of non-transitory machine-readable storage medium, such as suitable electronic, magnetic, optical, or other physical storage apparatus to contain or store information such as instructions 211, 212, 213, 214, 215, 216, 217 related data, and the like. As used herein, "machine-readable storage medium" may include a storage drive (e.g., a hard drive), flash memory, Random Access Memory (RAM), content-addressable memory (CAM), any type of storage disc (e.g., a Compact Disc Read Only Memory (CD-ROM), any other type of compact disc, a DVD, etc.) and the like, or a combination thereof. In some examples, storage medium 210 may include different types of memory for different types of information. In some examples, a storage medium may correspond to memory including a main memory, such as a Random Access Memory, where software may reside during runtime, and a secondary memory. The secondary memory can, for example, include a non-volatile memory where a copy of software or other data is stored. The storage medium 210 may also include a memory separate from main memory, such as a content addressable memory (CAM), tor TCAM to hold data that is used for networking.

In the example of FIG. 2, instructions 211, 212, 213, 214, 215, 216, and 217 are stored (encoded) on storage medium 210 and are executable by processing resource 201 to implement functionalities described herein in relation to FIG. 2. In some examples, storage medium 210 may include additional instructions. In other examples, the functionalities of any of the instructions of storage medium 210 may be implemented in the form of electronic circuitry, in the form of executable instructions encoded on machine-readable storage medium, or a combination thereof.

Processing resource 201 may, for example, be in the form of a central processing unit (CPU), a semiconductor-based microprocessor, a digital signal processor (DSP) such as a digital image processing unit, other hardware devices or processing elements suitable to retrieve and execute instructions stored in a storage medium, or suitable combinations thereof. The processing resource can, for example, include single or multiple cores on a chip, multiple cores across multiple chips, multiple cores across multiple devices, or suitable combinations thereof. The processing resource can be functional to fetch, decode, and execute instructions 211, 212, 213, 214, 215, 216, and 217 as described herein.

Networking device 200 may be part of a network, such as network 1000 as shown in FIG. 1. The components of networking device 200 of FIG. 2 may be present in networking devices 200A and 200B of FIG. 1.

Instructions 211 may be executable by processing resource 201 to receive a minimum value in a range of consecutive networking integers. In some examples, the minimum value may be part of an overall range by a network administrator. As discussed above, the overall range of networking integers may describe ports on a computing device, VLANs used in the network, etc. As discussed above, the overall range of consecutive networking integers may be split up into sub-ranges. For example, an overall range may be 25000 to 40000, and a sub-range of that overall range may be 25000 to 34000. A minimum value of that would be 25000. Additionally, a sub-range of the overall range of 25000 to 40000 may be 340001 to 40000. A minimum value of that would be 340001. Accordingly, as used herein, a minimum value may be the lowest integer in a sub-range of consecutive networking integers. A minimum value may be the same as the lowest integer in the lowest sub-range of the overall range of consecutive networking integers. For examples, in the overall range of 25000 to 40000, a minimum value may be 25000, which is the lowest integer of the sub-range of 25000 to 34000 and the lowest integer in the overall range of 25000 to 40000. A range, due to its splitting into sub-ranges, thus may have multiple minimum values, like a first minimum value, a second minimum value, etc. The usage of "first", "second, "third", etc. in "first minimum value", a "second minimum value", etc. is to distinguish one minimum value from another minimum value, and may not represent the actual placement of those values in the overall range. For example, a "first minimum value" may not be the lowest value in the overall range. In the example of the overall range of 25000 to 40000, and sub-ranges 25000 to 34000 and sub-range 34001 to 40000, a first minimum value may be 340001 and not 25000.

In some examples, the minimum value may be entered by an administrator of the network. For example, when determining a first sub-range of an overall range, the minimum value may be entered by an administrator. In other examples, the minimum value may be sent by networking device 200 itself. For example, when determine a sub-range after the first sub-range, the minimum value may be based on the span of the previous sub-range.

Instructions 212 may be executable by processing resource 201 to determine a first value based on the minimum value. In some examples, as described above, the networking device 200 may use a high speed memory structure, such as a TCAM, to store entries for networking rules. Accordingly, in some examples, the first value may be characterized as a first TCAM value. A TCAM may store a networking integer in its binary form using zeros and ones to translate a decimal number into its binary form. Thus, a TCAM value is the binary form of whatever the minimum value is. For example, in a range of 25000-40000, the minimum value in the range is 25000, and the first TCAM value is 110000110101000. For purposes of brevity, binary 110000110101000 may be also represented by hex 0x61A8.

Instructions 213 may be executable by processing resource 201 to determine a number of trailing zeros in the first TCAM value. As used herein, a trailing zero includes a zero in the first TCAM value that does not affect the first TCAM value. In other words, those zeros in those positions are not needed to achieve the minimum value in binary form. Based on the example above with the range of 25000-40000, the number of trailing zeros in the first TCAM value of 0x61A8 is three.

Instructions 214 may be executable by processing resource 201 to determine a proposed TCAM mask based the binary opposite of the first TCAM value. As used herein, a binary opposite of an original binary number includes exchanging the zeros in the original binary number to ones. Thus, a binary opposite of 110000110101000 is 111111111111111. The proposed TCAM mask may also be based on the trailing zeros in the first TCAM value. Thus, the proposed TCAM mask takes into account the number of trailing zeros in the first TCAM value and leaves these trailing zeros in the binary opposite. Accordingly, because the first TCAM value has three trailing zeros, those zeros would not be changed to ones in the proposed TCAM mask. Thus, the proposed TCAM mask would be 111111111111000 instead of 111111111111111 to take into account the trailing zeros in the TCAM value.

In some examples, the proposed TCAM mask is also based on the bit length of the field that the networking integer is used in. For example, in a port field used in L4 protocol, the field length may have 16 bits, rather than the 15 bits needed to capture the port value (i.e. the TCAM value). For the additional bit or bits, a value of one may be placed. Accordingly, the proposed TCAM mask may be 1111111111111000 (hex 0XFFF8, with 16 bits) instead of 111111111111000 (with 15 bits). In examples where there is more than one additional bit, a value of one may be placed in those additional bits to generate the proposed TCAM mask. As another example, a VLAN field may have room for 12 bits of data to capture the VLAN. Accordingly, in those examples the proposed TCAM mask would also have 12 bits, regardless of the number of bits needed to capture the actual VLAN value.

Instructions 215 nay be executable by processing resource 201 to compare the proposed TCAM mask to the maximum value in the range. As used herein, the maximum value associated to the range is the highest value in the overall range of consecutive integers. For example, in the range of 25000-40000, the maximum value is 40000. Additionally, in relation to the sub-range of 25000 to 34000, the maximum value is still 40000 because it is the highest value in the overall range of consecutive integers of 25000 to 40000. Thus, in a range, there is one maximum value. In some examples, the comparison of the proposed TCAM mask and the maximum value may be accomplished by adding the minimum value to a NOT of the proposed TCAM mask and determining whether that sum is less than or equal to the maximum value.

As used herein, a NOT of the proposed TCAM mask includes exchanging the zeros in the proposed TCAM mask for ones and the ones in the proposed TCAM mask for zeros. For example, a sub-range in the overall range of 25000-40000 may start with (e.g., have a minimum value of) 38912 (hex 0x9800, binary 1001100000000000). A first proposed TCAM mask for this sub-range is hex 0xF800 (binary 1111100000000000). This is determined by taking the binary opposite of the binary of 38912 and keeping the trailing zeros the same. To determine whether the proposed TCAM mask should be used, a NOT of the proposed TCAM mask may be determined. The NOT of the proposed TCAM mask of hex 0xF800 is binary 0000011111111111 (decimal 2047). The NOT is added to the minimum value in the sub-range (2047+38912). This sum (40,959) is then compared to the maximum value in the overall range.

Instructions 216 may be executable by processing resource 201 to determine a first TCAM mask for the first TCAM value based on the comparison. Based on a comparison result that indicates that the sum is less than or equal to the maximum value, instructions 216 may determine that the first TCAM mask is the proposed TCAM mask. Instructions 217 may be executable by processing resource 201 to program the first TCAM value and the first TCAM mask in a TCAM of networking device 200 or a TCAM of another networking device.

Based on a comparison result that indicates that the sum is higher than the maximum value, instructions 216 may determine that the proposed TCAM mask is not the first TCAM mask. Accordingly, instructions stored on machine-readable storage medium 210 may allow networking device 200 to determine another proposed TCAM mask.

For example, instructions 214 may also be executable by processing resource 201 to determine another proposed TCAM mask. This may be in response to a determination by instructions 216 that the first proposed TCAM mask is not the first TCAM mask. This may be accomplished by reducing the first proposed TCAM mask by one bit (i.e., turning a zero value that is located to the most-far left bit to a one). This may be characterized as a signed right shift. In the example discussed above, the new proposed TCAM mask is binary 1111110000000000.

Instructions 215 may also be executable by processing resource 201 to compare the new proposed TCAM mask to the maximum, in a manner as described above in relation to the first proposed TCAM mask. Accordingly, a NOT of the new proposed TCAM mask is determined (0000001111111111, decimal 1023) and is added to the minimum in the sub-range (1023+38912). This sum (39,935) is less than the maximum value (40,000) in the overall range.

Instructions 216 may be executable by processing resource 201 to determine a first TCAM mask for the first TCAM value based on the new comparison using the new proposed TCAM mask. Based on a comparison result that indicates that the sum is less than the maximum value, instructions 216 determines that the first TCAM mask is the new proposed TCAM mask.

Instructions 217 may also be executable by processing resource 201 to program the first TCAM value and the first TCAM mask in a TCAM of networking device 200 or a TCAM of another networking device. The TCAM entry may then be used to configure the network that networking device 200 is connected to, such as in associating specific L4 port values or VLANs to network access rules.

Figure 3:
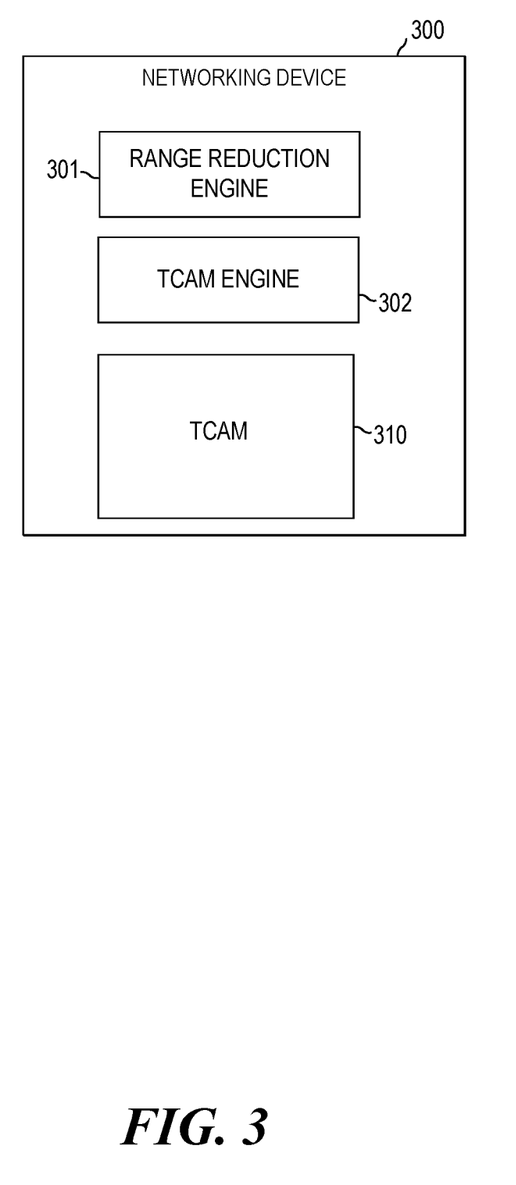
FIG. 3 is a block diagram of a networking device with a tertiary content addressable memory (TCAM) engine to program the sub-ranges into a TCAM, according to some examples.

Networking device 200, which is described in terms of instructions and processing resource, may include aspects of networking device 300 of FIG. 3.

FIG. 3 shows a block diagram of a networking device 300. Networking device 300 comprises a range reduction engine 301, a TCAM engine 302, and a TCAM 310.

Each of engines 301, 302 and any other engines, may be any combination of hardware (e.g., a processor such as an integrated circuit (ASIC) or other circuitry) and software (e.g., machine or processor-executable instructions, commands, or code such as firmware, programming, or object code) to implement the functionalities of the respective engine. Such combinations of hardware and programming may be implemented in a number of different ways. A combination of hardware and software can include hardware (i.e., a hardware element with no software elements), software hosted at hardware (e.g., software that is stored at a memory and executed or interpreted at a processor), or hardware and software hosted at hardware. Additionally, as used herein, the singular forms "a," "an," and "the" include plural referents unless the context clearly dictates otherwise. Thus, for example, the term "engine" is intended to mean at least one engine or a combination of engines.

Each engine of networking device 300 can include at least one machine-readable storage mediums (for example, more than one) and at least one computer processor (for example, more than one). For example, software that provides the functionality of engines on networking device can be stored on a memory of the networking device 300 to be executed by a processor of networking device 300.

TCAM 310 may be separate from the memory that stores the software and/or data for the functionality of engines on networking device and comprises a storage medium that allows for quick retrieval of information that is used for moving (e.g., forwarding) data packets received by networking device 300. TCAM 310 may be used to store network configuration data, such as access control lists, etc. In some examples, storing this data in a specialized memory such as a TCAM 310 allows for a more consistent performance of packet forwarding by networking device 300.

Range reduction engine 301 includes a combination of hardware and software that allows networking device 300 to determine a first TCAM value based on a minimum value in a range of networking integers. As discussed above in relation to FIG. 2, a minimum value in a range of networking integers may be a minimum value in a sub-range of an overall. The range reduction engine 301 may also allow networking device 300 to determine a proposed TCAM mask based on a number of trailing zeros in the first TCAM value and a binary opposite of the first TCAM value. The trailing zeros and the binary opposite is similar as described above in relation to FIG. 1. The proposed TCAM mask may be turned into a first TCAM mask that is paired with the first TCAM value in a TCAM entry as a value/mask pair.

Range reduction engine 301 additionally allows networking device 300 to determine a first TCAM mask for the first TCAM value. The determination may be based on a comparison of the proposed TCAM mask to a maximum value in the range of networking integers. In some examples, this is accomplished by taking the NOT of the proposed TCAM mask and adding the NOT to the minimum value in the range. This sum is then compared to the maximum value in the range.

Range reduction engine 301 may also allow networking deice 300 to determine a first TCAM mask for the first TCAM value based on the comparison. Based on a determination that the sum is less than or equal to the maximum value in the range, range reduction engine 301 determines that the proposed TCAM mask should be the first TCAM mask for the first TCAM value.

TCAM engine 302 includes a combination of hardware and software that allows networking device 300 to set the first TCAM mask, as determined by the range reduction engine 301, and the first TCAM value in a first entry on TCAM 310 of networking device 300. In some examples, this is in response to a determination that the proposed TCAM mask should be the first TCAM mask. This may include programing the TCAM as is known in the art.

Going back to range reduction engine 301, based on a determination that the sum is more than the maximum value in the range, range reduction 301 determines that the proposed TCAM mask should not be the first TCAM mask for the first TCAM value. In response to this, range reduction engine 301 may determine a new proposed TCAM mask. As discussed above in relation to instructions 214, a new proposed TCAM mask may be determined by taking the originally proposed TCAM mask and reducing it by one. Range reduction engine 301 may compare the new proposed TCAM mask to the maximum value in the range and determine whether the new proposed TCAM mask should be the first TCAM mask.

As discussed above, an overall range may be covered in more than one sub-range. Accordingly, range reduction engine 301 may also allow networking device 300 to determine whether additional sub-ranges are needed to cover the overall range. In examples where there multiple sub-ranges are needed, each sub-range has its own minimum value. The minimum value of the first sub-range (i.e. the lowest sub-range of all the ranges) will be the minimum value of the overall range. However, the minimum value of each subsequent sub-range will depend on the sub-range before it.

For example, in the overall range of 25000-40000, the minimum value of the first sub-range is 25000. Range reduction engine 301 determines that the first TCAM value is 110000110101000 (hex 0x61A8) and TCAM mask for the first TCAM value is 1111111111111000 (hex 0xFFF8). Range reduction engine 301 may also determine where additional sub-ranges are needed. To accomplish this, range reduction engine 301 may first take a NOT of the TCAM mask, add that to the minimum value of the first sub-range plus 1. Based on a determination that this sum is higher than the maximum value by one, then range reduction engine 301 may determine that no additional sub-ranges are needed. Based on a determination that this sum is equal to or less than the maximum value, then range reduction engine 301 may determine that additional sub-ranges are needed.

In the example of the first sub-range, the NOT of the TCAM mask for the first TCAM value is 0000000000000111. The decimal form of this is 7. Thus, the sum of 7+25000+1 is 25008. 25008 is less than the maximum value of 40000. Accordingly, range reduction engine 301 determines that an additional sub-range is needed to cover the overall range.

25008 becomes the minimum in the additional sub-range, 25008 is also the minimum value that is used by range reduction engine 301 to determine a second TCAM value. Thus, in this example, 25000 may be the first minimum value and 25008 may be the second minimum value. Accordingly, the second TCAM value is based on the first TCAM mask.

Using this second minimum, range reduction engine 301 may determine a proposed TCAM mask for the second TCAM value, compare the proposed TCAM mask to the maximum value in the range, and determine a second TCAM mask for the second TCAM value based on the comparison, as is discussed in relation to the first TCAM value. TCAM engine may then set the second TCAM value and the second TCAM mask in the networking device TCAM. Range reduction engine 301 may also determine whether an additional sub-range (e.g., a third sub-range) is needed to cover the overall range. If an additional sub-range is needed, then range reduction engine 301 may determine the additional minimum values (e.g., a third minimum value), additional TCAM values (e.g., a third TCAM value) and masks (e.g., a third TCAM mask) needed for the additional sub-ranges.

In some examples, TCAM engine 302 may allow networking device 300 to associate each TCAM entry to a networking rule. For example, the first TCAM value and first TCAM mask may be set in a first TCAM entry of the TCAM 310. The first TCAM value and first TCAM mask may represent a range of source ports in an L4 protocol of networking device 300. TCAM engine 302 may associate that first entry to a first networking rule. Accordingly, when a specific port is looked up in the TCAM, if the specific port is captured in a TCAM entry, the look up of the TCAM will call up the specific networking rule that is associated with that entry. The networking rule, for example, may grant access to a specific route to packets coming from the range of source ports represented by the first TCAM value and the first TCAM mask. In other examples, the networking rule may deny access to packets coming from the range of source ports. Other networking rules may include forwarding rules, VLAN configurations, etc. TCAM engine 302 may also enter any additional TCAM values and masks that are needed for any additional sub-ranges by TCAM engine 302 in TCAM entries and associate those entries to various networking rules.

Networking device 300, which is described in terms of engines, instructions and processing resource, may include aspects of networking device 200 of FIG. 2, which is descripted in terms of instructions and processing resource.

Figure 4:
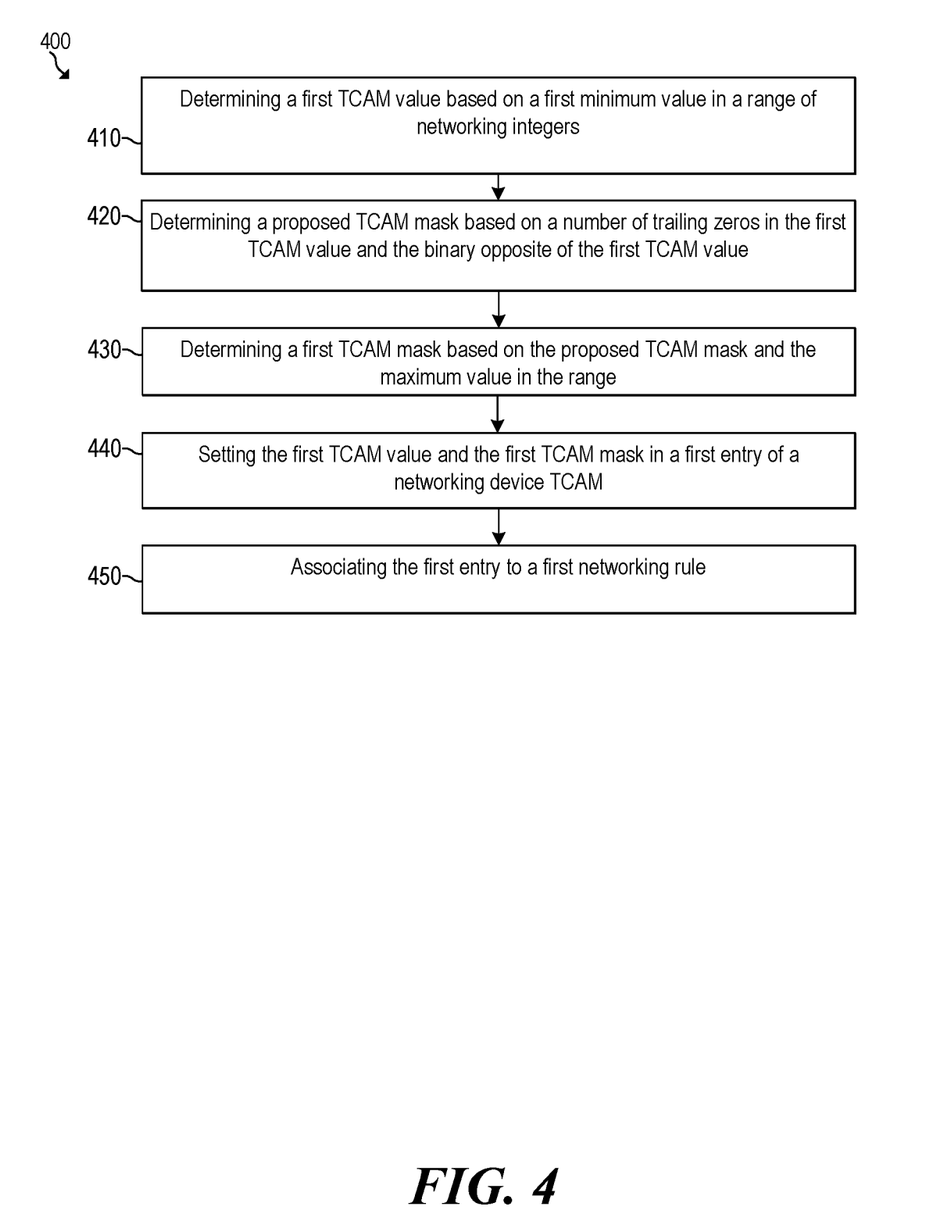
FIG. 4 is a block diagram of a flowchart of setting a TCAM value and a TCAM mask as a sub-range in a range of networking integers, according to some examples.

FIG. 4 illustrates a flowchart for method 400 to determine sub-ranges of an overall range. Although execution of method 400 is described below with reference to networking device 300, other suitable devices for execution of method 400 may be used (e.g., networking device 200 of FIG. 2).

At 410 range reduction engine 301 may determine a first TCAM value based on a minimum value in a range of networking integers. As discussed above, the minimum value may be one of many minimums in the overall range and may characterized as the minimum value in the sub-range that range reduction engine 301 determines.

At 420, range reduction engine 301 may determine a proposed TCAM mask for the first TCAM value. The proposed TCAM mask may be based on a number of trailing zeros in the first TCAM value and the binary opposite of the first TCAM value.

At 430, range reduction engine 301 may determine a first TCAM mask based on the comparison of the proposed TCAM mask to the maximum value in the range.

At 440, TCAM engine 302 may set the first TCAM value and the first TCAM mask in a first entry of TCAM 310 of networking device 300. In other words the first TCAM value and the first TCAM mask are programmed into the TCAM as a value/mask pair.

At 450, TCAM engine 302 may associate the first entry to a first networking rule.

Although the flowchart of FIG. 4 shows a specific order of performance of certain functionalities, method 400 is not limited to that order. For example, some of the functionalities shown in succession may be performed in a different order, may be executed concurrently or with partial concurrence, or a combination thereof. In some examples, functionalities described herein in relation to FIG. 4 may be provided in combination with functionalities described herein in relation to any of FIGS. 1-3.

Figure 5:
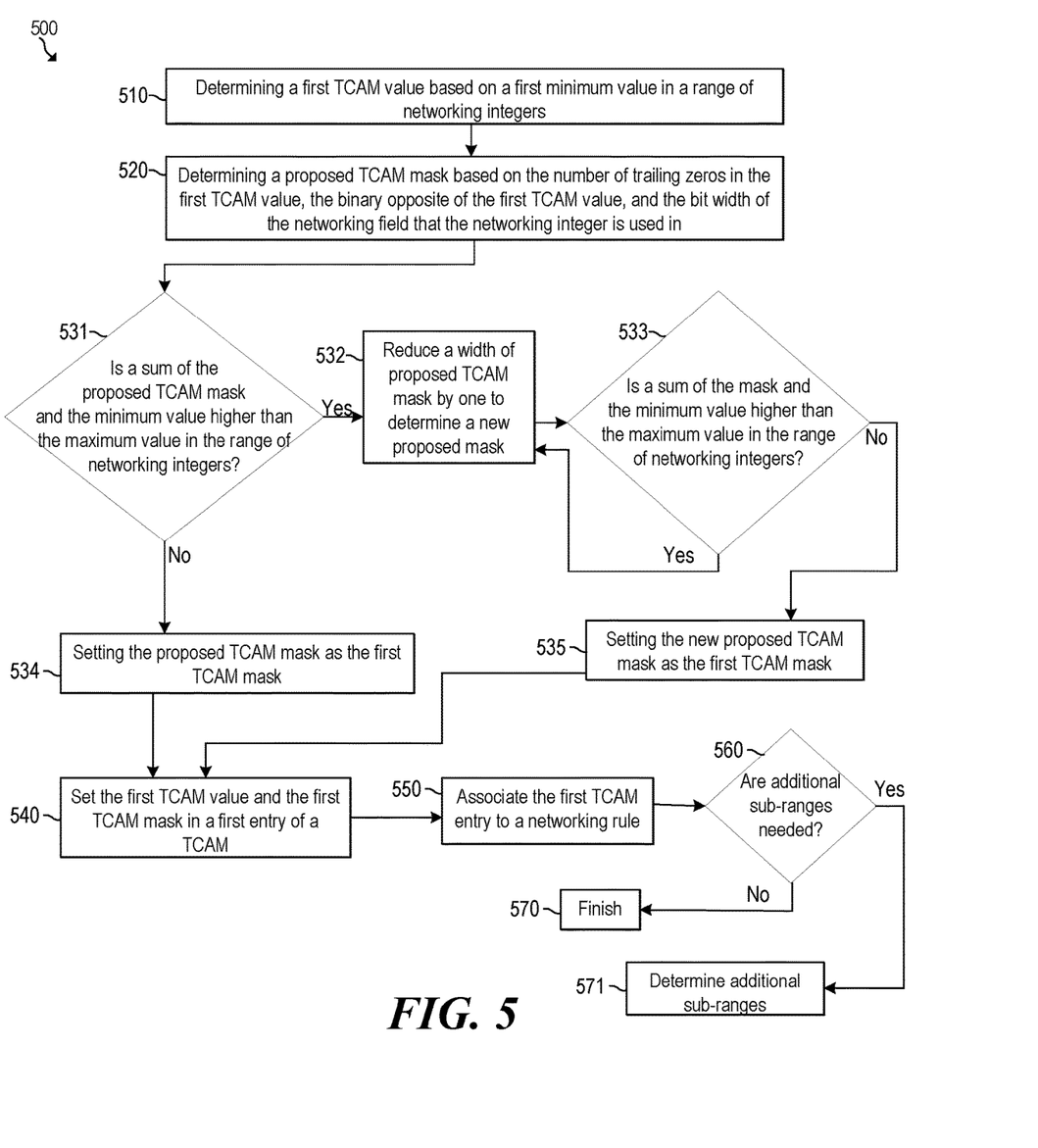
FIG. 5 is a block diagram of a flowchart of determining whether a proposed TCAM mask is an appropriate TCAM mask, according to some examples.

FIG. 5 is a block diagram of a flowchart of determining whether a proposed TCAM mask is an appropriate TCAM mask, according to some examples. Although execution of method 500 is described below with reference to networking device 300, other suitable devices for execution of method 500 may be used (e.g., networking device 200 of FIG. 2).

510 is similar to 410 of FIG. 4 and the descriptions related to 510 are applicable to 410 as well. At 520, range reduction engine 301 may determine a proposed TCAM mask for the first TCAM value based on a number of trailing zeros in the first TCAM value and the binary opposite of the first TCAM value.

In some examples, the proposed TCAM mask may also be based on the bit width of a networking field that the networking integer is used in. For example, a port field may allow for 16 bits (have a bit width of 16) but the port value may be captured in 15 bits. In this instance, the proposed TCAM mask may have 16 bits instead of 15 bits, with the value of the additional bit being a one.

At 531, range reduction engine 301 determines whether a sum of the proposed TCAM mask and the minimum value of the range is higher than the maximum value in the range. Based on a determination that the sum is higher than the maximum value, method 500 proceeds to 532. Based on a determination that sum is equal to or lower than the maximum value, method 500 proceeds to 534, where range reduction engine 301 sets the proposed TCAM mask as the first TCAM mask in TCAM 310.

Going back to 532, at 532, range reduction engine 301 reduces a width of the proposed TCAM mask by one to determine a new proposed TCAM mask for the first TCAM value. As discussed above, this may be accomplished by turning the bit with a value of zero that is most far from the left to a value of one (for example, turning 11100 to 11110). At 533, range reduction engine 301 determines whether a sum of the new proposed mask and the minimum value higher than the maximum value in the range of networking integers. Based on a determination that the sum of the new proposed TCAM mask and the minimum value is higher than the maximum value, method 500 goes back to 532 to reduce the width of the new proposed TCAM mask to get another (second) new proposed TCAM mask. Then, using the second new proposed TCAM mask, method 500 goes to 533 again until the answer is no.

Based on a determination that the new proposed TCAM mask is equal to or lower than the maximum value in the range, method 500 proceeds to 535. At 535, TCAM engine sets the new proposed TCAM mask as the first TCAM mask.

From 534 and 535, method 500 proceeds to 550 and TCAM engine 302 associates the first TCAM value and the first TCAM mask to a first networking rule. At 560, range reduction engine 301 determines whether additional sub-ranges are needed. This is similar to what is described in relation to FIG. 3. Based on a determination that additional sub-ranges are not needed, method 500 proceeds to 570. Based on a determination that additional sub-ranges are needed, method proceeds to 571, where additional sub-ranges are determined as described in relation to FIG. 3.

Although the flowchart of FIG. 5 shows a specific order of performance of certain functionalities, method 400 is not limited to that order. For example, some of the functionalities shown in succession may be performed in a different order, may be executed concurrently or with partial concurrence, or a combination thereof. In some examples, functionalities described herein in relation to FIG. 5 may be provided in combination with functionalities described herein in relation to any of FIGS. 1-3 and 4.

All of the features disclosed in this specification (including any accompanying claims, abstract and drawings), and/ or all of the elements of any method or process so disclosed, may be combined in any combination, except combinations where at least some of such features and/or elements are mutually exclusive.

What is claimed is:

1. A non-transitory machine-readable storage medium comprising instructions, that when executed, cause a processing resource to:
   receive a first minimum value in a range of consecutive networking integers corresponding to a configuration parameter of a networking device;
   determine a first ternary content-addressable memory (TCAM) value based on the first minimum value;
   determine a proposed TCAM mask based on the first minimum value;
   compare the proposed TCAM mask to a maximum value associated with the range;
   determine a first TCAM mask for the first TCAM value based on the comparison, wherein the first TCAM mask indicates a sub-range associated with the first minimum value in the range of consecutive networking integers; and
   store the first TCAM value and the first TCAM mask in a TCAM of the networking device.

2. The non-transitory machine-readable storage medium of claim 1, comprising instructions, that when executed, cause the processing resource to:
   determine a second minimum value based on the first TCAM mask and the first TCAM value in the range of consecutive networking integers.

3. The non-transitory machine-readable storage medium of claim 2, comprising instructions, that when executed, cause the processing resource to:
   determine a second TCAM mask is based on the second minimum value.

4. The non-transitory machine-readable storage medium of claim 1, comprising instructions, that when executed, cause the processing resource to:
   identify the first TCAM value and the first TCAM mask in an entry of TCAM of the networking device; and
   associate the entry to a networking rule.

5. The non-transitory machine-readable storage medium of claim 1, wherein the range of consecutive integers networking corresponds to identifiers of transport layer ports of the networking device.

6. The non-transitory machine-readable storage medium of claim 1, wherein the range of consecutive networking integers corresponds to identifiers of virtual local area network (VLAN) domains associated with the networking device.

7. The non-transitory machine-readable storage medium of claim 1, wherein the proposed TCAM mask is based on a bit width of a field of a packet using the networking integer.

8. A method, comprising:
   receiving a first minimum value in a range of consecutive networking integers corresponding to a configuration parameter of a networking device;
   determining a first ternary content-addressable memory (TCAM) value based on the first minimum value;
   determining a proposed TCAM mask based on the first minimum value;
   comparing the proposed TCAM mask to a maximum value associated with the range;
   determining a first TCAM mask for the first TCAM value based on the comparison, wherein the first TCAM mask indicates a sub-range associated with the first minimum value in the range of consecutive networking integers; and storing the first TCAM value and the first TCAM mask in a TCAM of the networking device.

9. The method of claim 8, comprising:
determining a second minimum value based on the first TCAM mask and the first TCAM value in the range of consecutive networking integers; and
determining a second TCAM mask based on second minimum value.

10. The method of claim 8, comprising:
identifying the first TCAM value and the first TCAM mask in an entry of the TCAM of the networking device; and
associating the entry to a networking rule.

11. The method of claim 10, wherein the networking rule comprises an access control list (ACL).

12. The method of claim 8, wherein the networking integers corresponds to identifiers of transport layer ports of the networking device.

13. The method of claim 8, wherein the networking integers corresponds to identifiers of VLAN domains associated with the networking device.

14. A networking device, comprising:
processing circuitry;
a number of ports;
a range reduction logic block to:
receive a first minimum value in a range of consecutive networking integers corresponding to a configuration parameter of a networking device;
determine a first ternary content-addressable memory (TCAM) value based on the first minimum value;
determine a proposed TCAM mask based on the first minimum value;
compare the proposed TCAM mask to a maximum value associated with the range; and
determine a first TCAM mask for the first TCAM value based on the comparison, wherein the first TCAM mask indicates a sub-range associated with the first minimum value in the range of consecutive networking integers; and
a TCAM to:
store the first TCAM mask and the first TCAM value in the TCAM.

15. The networking device of claim 14, comprising a policy logic block to:
identify the first TCAM value and the first TCAM mask in an entry of the TCAM; and
associate the entry with a networking rule.

16. The networking device of claim 14, wherein the networking integers corresponds to identifiers of transport layer ports of the networking device.

17. The networking device of claim 14, wherein the networking integers corresponds to identifiers of virtual local area network (VLAN) domains associated with the networking device.

18. The networking device of claim 14, wherein the range reduction engine is to:
determine a second minimum value based on the first TCAM mask and the first TCAM value in the range of consecutive networking integers; and
determine a second TCAM mask based on the second minimum value.

19. The non-transitory machine-readable storage medium of claim 4, wherein the networking rule comprises an access control list (ACL).

20. The method of claim 8, wherein the proposed TCAM mask is based on a bit width of a field of a packet using the networking integer.

* * * * *